(12) United States Patent
Anderson

(10) Patent No.: US 10,100,973 B2
(45) Date of Patent: Oct. 16, 2018

(54) FLANGE ADAPTER

(71) Applicant: ERICO INTERNATIONAL CORPORATION, Solon, OH (US)

(72) Inventor: Scott Anderson, Garretsville, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 15/597,982

(22) Filed: May 17, 2017

(65) Prior Publication Data

US 2017/0336021 A1 Nov. 23, 2017

Related U.S. Application Data

(60) Provisional application No. 62/339,499, filed on May 20, 2016.

(51) Int. Cl.
| | |
|---|---|
| *F16B 2/06* | (2006.01) |
| *F16M 13/02* | (2006.01) |
| *F16L 3/24* | (2006.01) |
| *A47B 96/06* | (2006.01) |

(52) U.S. Cl.
CPC ............. *F16M 13/02* (2013.01); *F16B 2/065* (2013.01); *F16M 13/022* (2013.01); *F16L 3/24* (2013.01)

(58) Field of Classification Search
CPC ...... F16B 2/065; F16M 13/02; F16M 13/022; F16L 3/24
USPC ... 248/228.1, 226.11, 72, 228.6, 218.3, 300; 24/298; 138/106; 52/167.3; 29/525.11
See application file for complete search history.

(56) References Cited

U.S. PATENT DOCUMENTS

| | | | | |
|---|---|---|---|---|
| 661,034 | A | 11/1900 | Burwinkle | |
| 1,470,642 | A | 10/1923 | Ready | |
| 3,232,393 | A * | 2/1966 | Attwood | E04L 31/38 24/486 |
| 3,341,909 | A | 9/1967 | Havener | |
| 4,570,885 | A | 2/1986 | Heath | |
| 5,897,088 | A | 4/1999 | Kirschner | |
| 5,947,424 | A | 9/1999 | Heath | |
| 6,098,942 | A * | 8/2000 | Heath | F16L 3/24 248/228.6 |
| 6,464,422 | B1 | 10/2002 | Kirschner | |
| D512,376 | S * | 12/2005 | Franks, Jr. | D13/133 |
| 7,073,754 | B2 | 7/2006 | Shuey | |
| 7,222,824 | B2 | 5/2007 | Shuey | |
| 7,281,695 | B2 | 10/2007 | Jordan | |
| 7,287,728 | B2 | 10/2007 | Shuey | |
| 7,614,590 | B2 | 11/2009 | Boville | |
| 7,891,618 | B2 | 2/2011 | Carnevali | |
| 7,971,838 | B2 * | 7/2011 | Osborn | F16B 2/065 248/228.1 |
| 7,988,464 | B2 * | 8/2011 | Kossak | F16B 2/065 439/803 |

(Continued)

*Primary Examiner* — Tan Le
(74) *Attorney, Agent, or Firm* — Quarles & Brady LLP

(57) ABSTRACT

A flange adapter can include a plurality of walls, with at least one wall being an overlapping wall. The overlapping wall can include multiple layers formed from overlapping folded sections extending from at least two other walls, or from overlapping extensions of at least two other walls. The overlapping wall can receive a fastener through the multiple layers to secure a support structure to the flange adapter. A main body of the flange adapter, including the plurality of walls, can be integrally formed from a single-piece of material.

20 Claims, 13 Drawing Sheets

(56) References Cited

U.S. PATENT DOCUMENTS

| | | | |
|---|---|---|---|
| 8,096,816 B2 | 1/2012 | Kossak et al. | |
| 8,100,369 B2 | 1/2012 | Osborn et al. | |
| 8,235,340 B2 | 8/2012 | Carnevali | |
| 8,496,236 B2 | 7/2013 | Merhar et al. | |
| 8,534,625 B2 * | 9/2013 | Heath | F16B 2/065 138/106 |
| 8,726,607 B1 | 5/2014 | Kirschner | |
| 8,857,771 B2 | 10/2014 | Streetman | |
| 8,882,056 B2 * | 11/2014 | Greenfield | F16L 3/24 248/228.6 |
| 9,239,067 B2 | 1/2016 | Heath et al. | |
| 2006/0065805 A1 | 3/2006 | Barton et al. | |
| 2013/0020447 A1 | 1/2013 | Heath et al. | |
| 2014/0013577 A1 | 1/2014 | Heath | |
| 2016/0123358 A1 | 5/2016 | Heath et al. | |

* cited by examiner

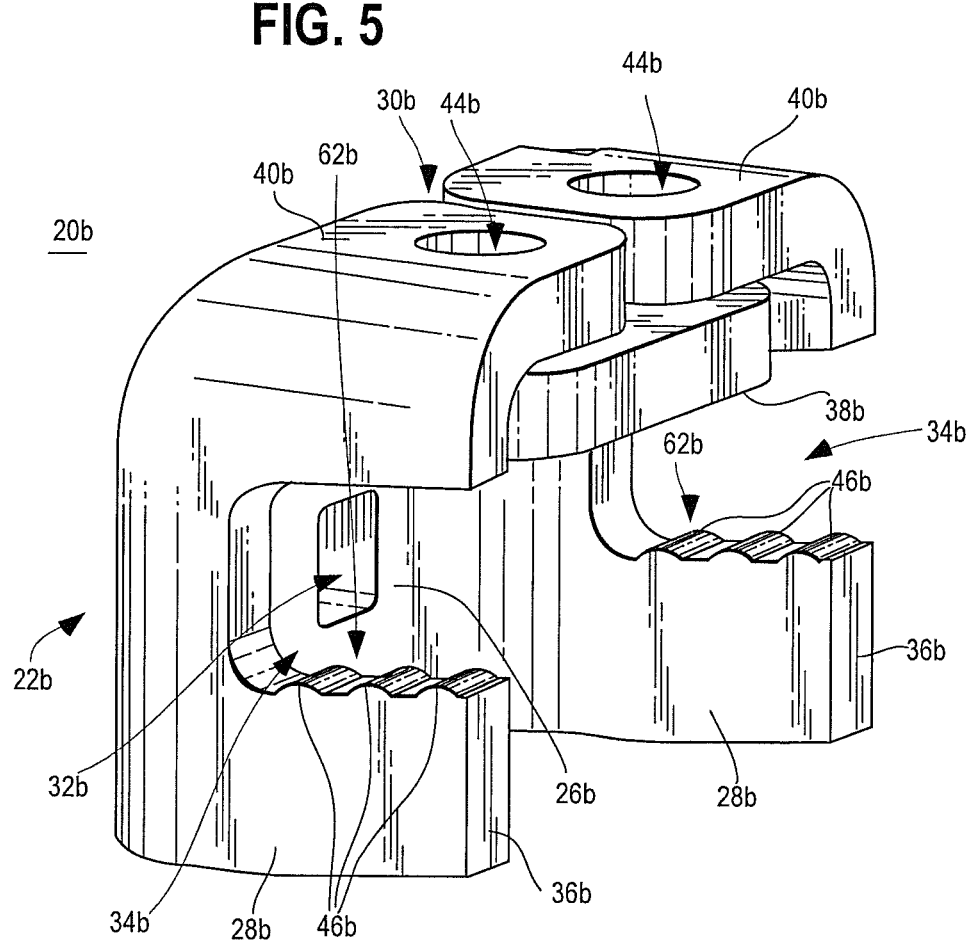

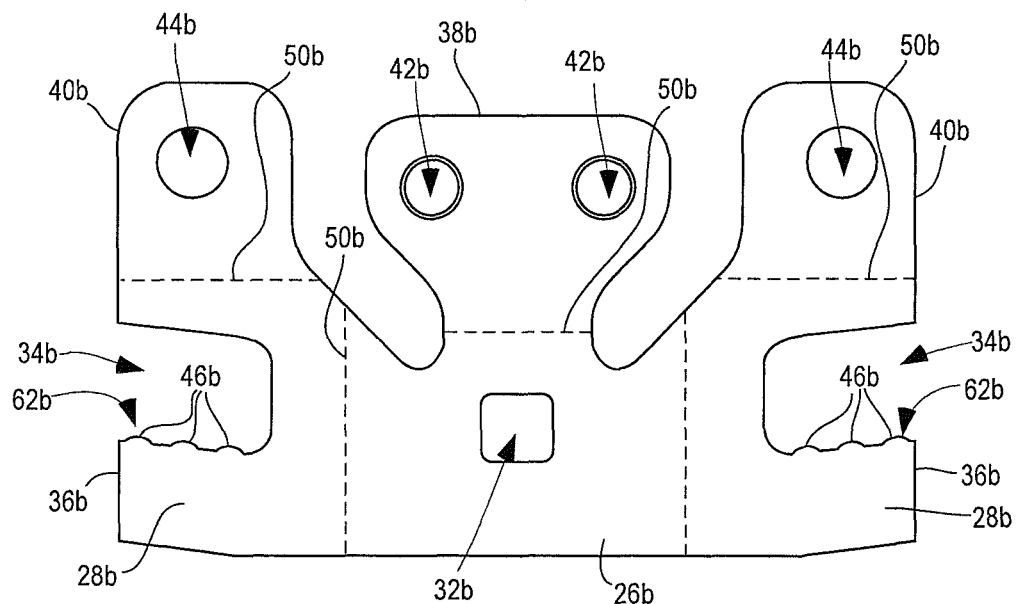
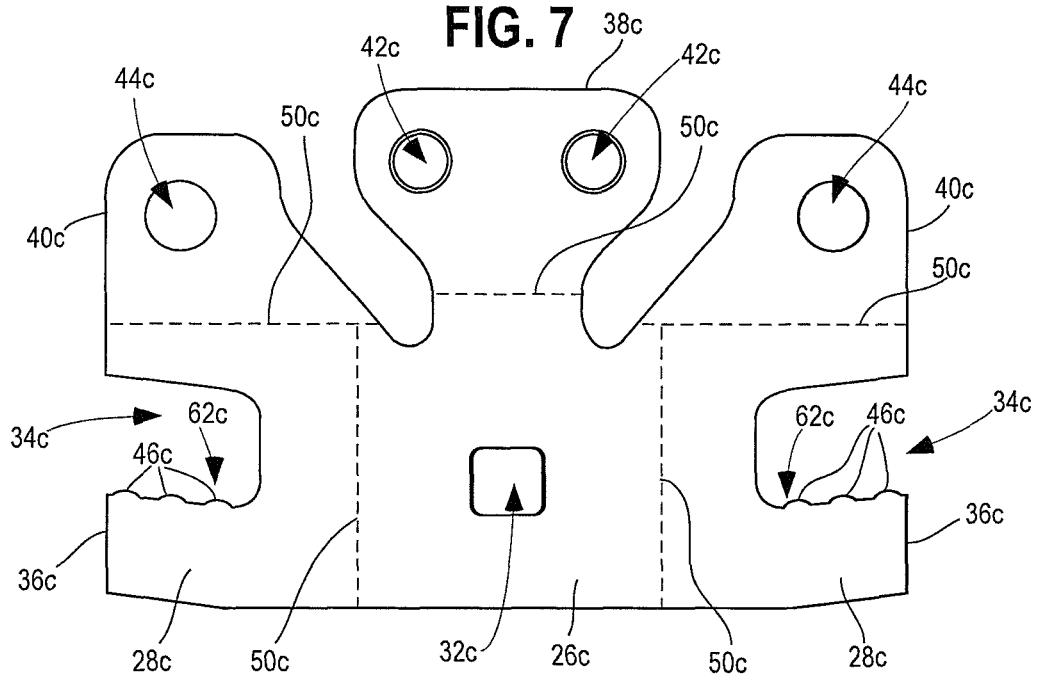

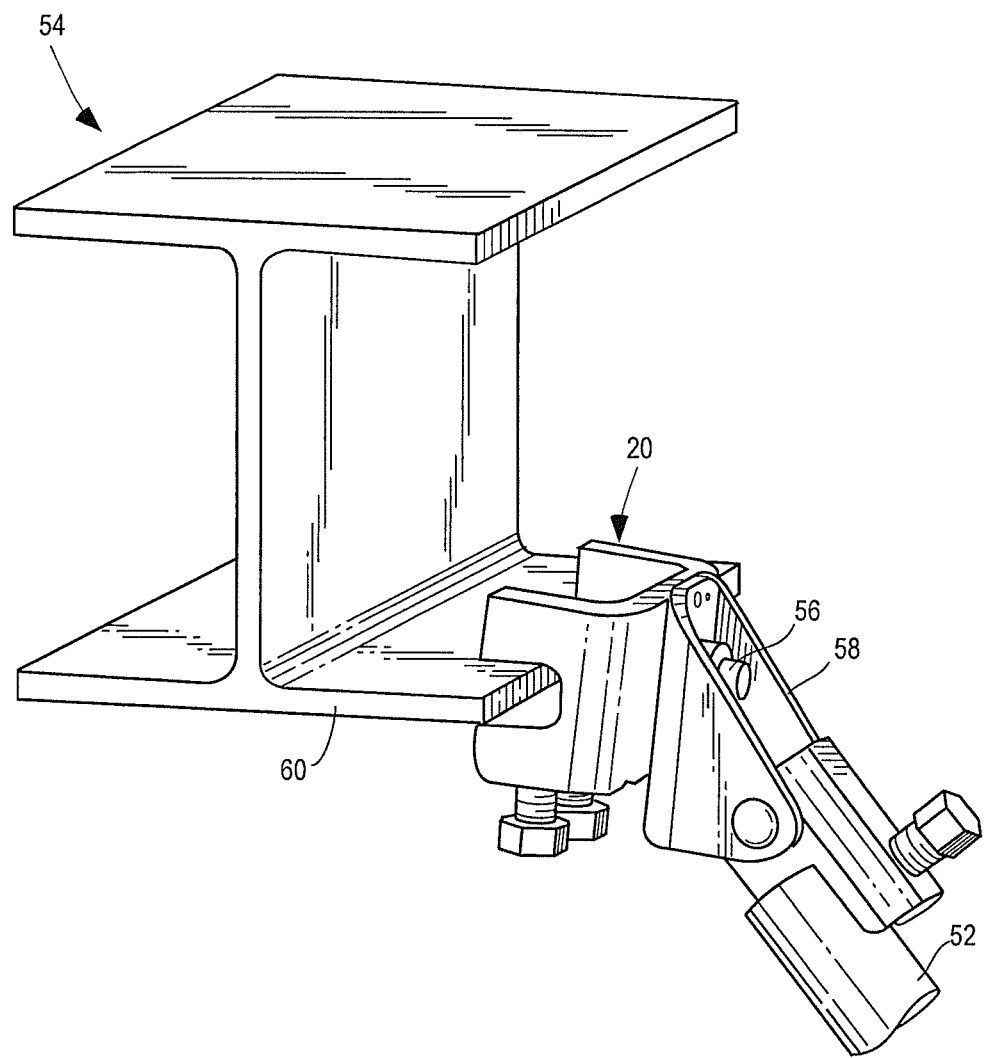

FLANGE ADAPTER

CROSS-REFERENCE TO RELATED APPLICATIONS

This application claims priority under 35 U.S.C. § 119 to U.S. Provisional Patent Application No. 62/339,499 filed on May 20, 2016, the entire contents of which are hereby incorporated by reference.

BACKGROUND

In many applications, it may be useful to attach a flange adapter to a building structure (or other support structure), in order to use the flange adapter to support a brace, hanging member, or other object. For example, it may be useful to attach a flange adapter to a roof beam to support parts of a seismic brace (e.g., to support a clamp or bracket for a seismic brace member). To adequately support seismic braces, and other objects, can sometimes require significant attachment strength at the relevant building structure.

SUMMARY

Some embodiments of the invention provide a flange adapter to attach an object to a support structure, for use in combination with one or more fasteners. The flange adapter can include a main body with a back wall, a first side wall extending away from the back wall, a second side wall extending away from the back wall, and a top wall extending between the back wall, the first side wall, and the second side wall. The top wall can include a first layer that includes a first folded section extending from the back wall of the main body, and a second layer that includes a second folded section extending from the first side wall and a third folded section extending from the second side wall. The first layer can at least partly overlap with the second layer along the top wall. A set of apertures can extend through the first and second layers of the top wall. The set of apertures can be configured to receive the one or more fasteners in order for the one or more fasteners to urge the support structure into engagement with at least one of the first and second side walls Some embodiments of the invention provide a flange adapter to attach an object to a support structure, for use in combination with at least one fastener. The flange adapter can include an integrally formed, stamped main body. The main body can include a first wall configured to engage the support structure, a second wall with a second-wall opening to secure the object to the flange adapter, and a third wall formed, at least in part, from an extension of the first wall and an extension of the second wall. The extension of the first wall can form a first layer of the third wall, and the extension of the second wall can form a second layer of the third wall that overlaps with the first layer of the third wall. The first and second layers of the third wall can be configured to receive the at least one fastener therethrough, to secure the support structure to the flange adapter.

Some embodiments of the invention provide a method of forming a flange adapter to attach an object to a support structure using a fastener. A single-piece blank can be provided. A first aperture can be formed in a first portion of the single-piece blank. A second aperture can be formed in a second portion of the single-piece blank. A first slot and a second slot can be formed in the single-piece blank. The single-piece blank can be bent to form the flange adapter, so that the first and second slots are aligned to simultaneously receive the support structure and the first portion of the single-piece blank overlaps with the second portion of the single-piece blank to is align the first and second apertures, so that the first and second apertures are configured to simultaneously receive the fastener to secure the support structure within the first and second slots.

Some embodiments of the invention provide a flange adapter for coupling an object to a building support. The flange adapter can include a main body with a back wall, a first side wall, a second side wall, and a top wall with an inner layer and an outer layer. The first side wall can extend substantially perpendicularly from the back wall. The second side wall can extend substantially perpendicularly from the back wall and substantially parallel to the first side wall. The top wall can extend substantially perpendicularly from the back wall and substantially perpendicularly to the first side wall and the second side wall. The inner layer of the top wall can include a first folded section extending from the back wall of the main body. The outer layer of the top wall can include a second folded section extending from the first side wall and a third folded section extending from the second side wall. The first folded section of the inner layer can at least partly overlap with the second folded section and the third folded section of the outer layer. The main body, including the back wall, the first side wall, the second side wall, and the top wall, can be a single integrally formed component.

Some embodiments of the invention provide a flange adapter for coupling an object to a building support. The flange adapter can include a main body with a back wall, a first side wall, a second side wall, and a top wall with an inner layer and an outer layer. The first side wall can extend substantially perpendicularly from the back wall. The second side wall can extend substantially perpendicularly from the back wall and substantially parallel to the first side wall. The top wall can extend substantially perpendicularly from the back wall and substantially perpendicularly to the first side wall and the second side wall. The outer layer of the top wall can include a first folded section extending from the back wall of the main body. The inner layer of the top wall can include a second folded section extending from the first side wall and a third folded section extending from the second side wall. The first folded section of the outer layer can at least partly overlap with second folded section and the third folded section of the inner layer. The main body, including the back wall, the first side wall, the second side wall, and the top wall, can be a single integrally formed component.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 5 is a front, left, top perspective view of a flange adapter similar to the flange adapter of FIG. 1, according to an embodiment of the invention;

FIG. 6 is a top plan view of a blank for the flange adapter of FIG. 5;

FIG. 7 is a top plan view of a blank for a flange adapter similar to the flange adapter of FIG. 4, according to an embodiment of the invention;

FIG. 8 is a perspective view of the flange adapter of FIG. 1 coupling a brace to a W beam;

DETAILED DESCRIPTION

Figure 1:
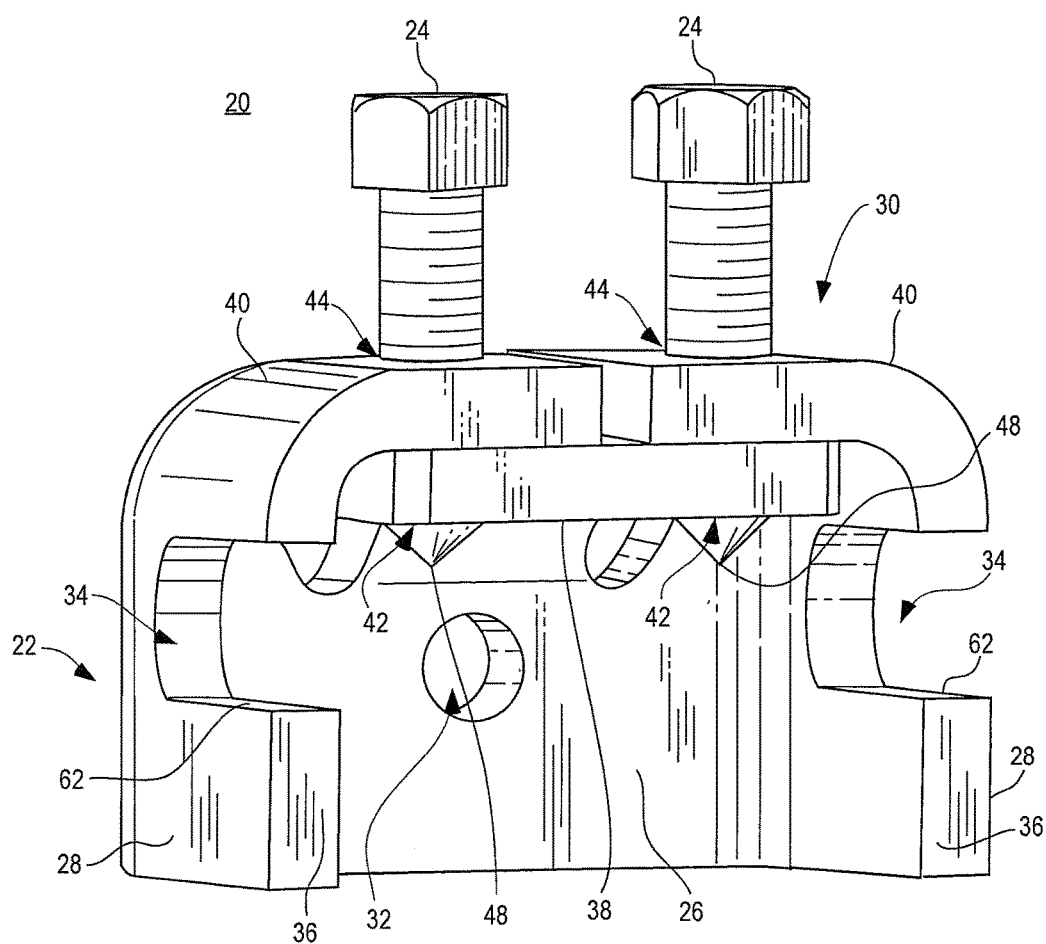
FIG. 1 is a front, left, top perspective view of a flange adapter, according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the category (or categories).

Also as used herein, unless otherwise specified or limited, words indicating relative orientation (e.g., upper, lower, right, left, top, bottom, below, above, and so on) are used with respect to the particular FIG. or embodiment being discussed. As such, it will be understood that these terms, unless otherwise specified, are not intended to be limiting of the scope of the invention. For example, some embodiments that are described as including "upper" features may be configured for use in multiple orientations, such that during some uses the "upper" features may actually be temporarily disposed as "lower" features. Similarly, embodiments with "front" and "rear" features can sometimes be used in multiple orientations, such that one or more "front" features may be disposed, in whole or in part, somewhat behind one or more "rear" features. Unless otherwise noted, this paragraph does not apply to the terms "inner" and "outer," and the like.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In the discussion below, various examples describe flange adapters for use with braces and hanging members (e.g., threaded rods). It will be understood that the braces and hanging members described are presented as examples only and that the disclosed flange adapters can be used to secure braces and hanging members with other configurations, other support apparatuses, or other objects generally, to support structures. Similarly, the term "flange" in the label "flange adapter" is not intended to be limiting, as embodiments of the invention can be used to secure objects to support structures that are not necessarily formed as conventional flanges.

Generally, flange adapters can be used to secure objects (e.g., a bracket for a seismic brace) to flanges or other building structures. Conventional flange adapters, however, can be relatively costly to manufacture, among other potential deficiencies. For example, some conventional adapters may need to be formed using casting processes, or may require multiple stampings. Adapters formed by casting can often require secondary machining to achieve an appropriate final form, which can add time and expense to the manufacturing processes. Multiple-stamping adapters can require a separate die for each stamping, multiple presses, different size metal coils for each die, and, potentially, multiple final assembly operations. Again, this can add time and expense, as well as complexity, to the manufacturing process.

In contrast, embodiments of the invention can be formed relatively efficiently, including by single stampings, or similar other processes. For example, in some embodiments, a single-piece blank can be used, such as a blank of relatively thick steel. Through successive stamping operations (e.g., on a single press), the single-piece blank can be formed into a multi-wall clamp structure, with at least one of the walls being formed by overlapping portions of the original blank. Such use of a single-piece blank can, for example, significantly simplify manufacturing processes while also reducing overall manufacturing time and costs. Further, the overlapping wall, as well as the potentially relatively thick material of the blank, can provide significant general structural strength while also facilitating significant clamping forces.

Some embodiments of the invention can provide other advantages. For example, conventional flange adapters can include a mounting surface (e.g., for attachment of a support bracket or other supported component) that is disposed to be generally parallel with a flange when the flange adapter is mounted to the flange. This can require an operator to exercise particular care with regard to how the flange adapter is mounted to the flange. For example, in order to ensure appropriate clamping force or clearance for an attached object, an operator may need to pay close attention with regard to the particular side of a structure (e.g., a W beam) to which a conventional flange adapter is mounted, and with regard to the side of a particular flange with which screws of the flange adapter are engaged. In contrast, embodiments of the invention can include a mounting surface that is disposed to be generally perpendicular to a flange (or other structure) that is engaged by the relevant flange adapter. This can, for example, usefully allow an operator to mount an adapter to the flange (or other structure) in different configurations, while also providing significantly improved range of access to, and range of potential orientation or movement for, attached components (e.g., seismic brace members). For example, for some embodiments of the invention, sufficient clamping force and wide ranges of access and object movement or orientation can be provided with screws (or other fasteners) of the relevant flange adapter engaging either side of the relevant flange (or other structure), including for angled flanges of S beams and similar other structures.

Figure 2:
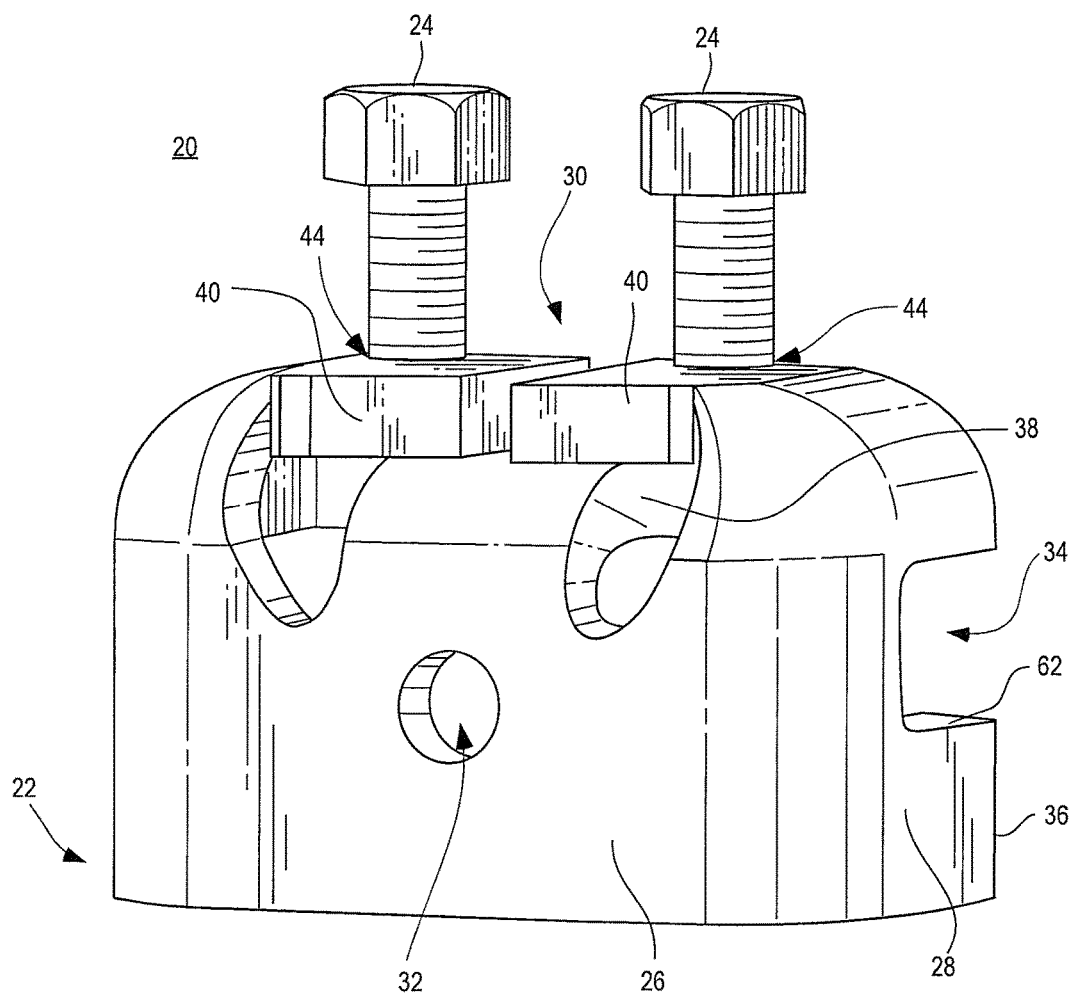
FIG. 2 is a back, left, top perspective view of the flange adapter of FIG. 1.
Figure 3:
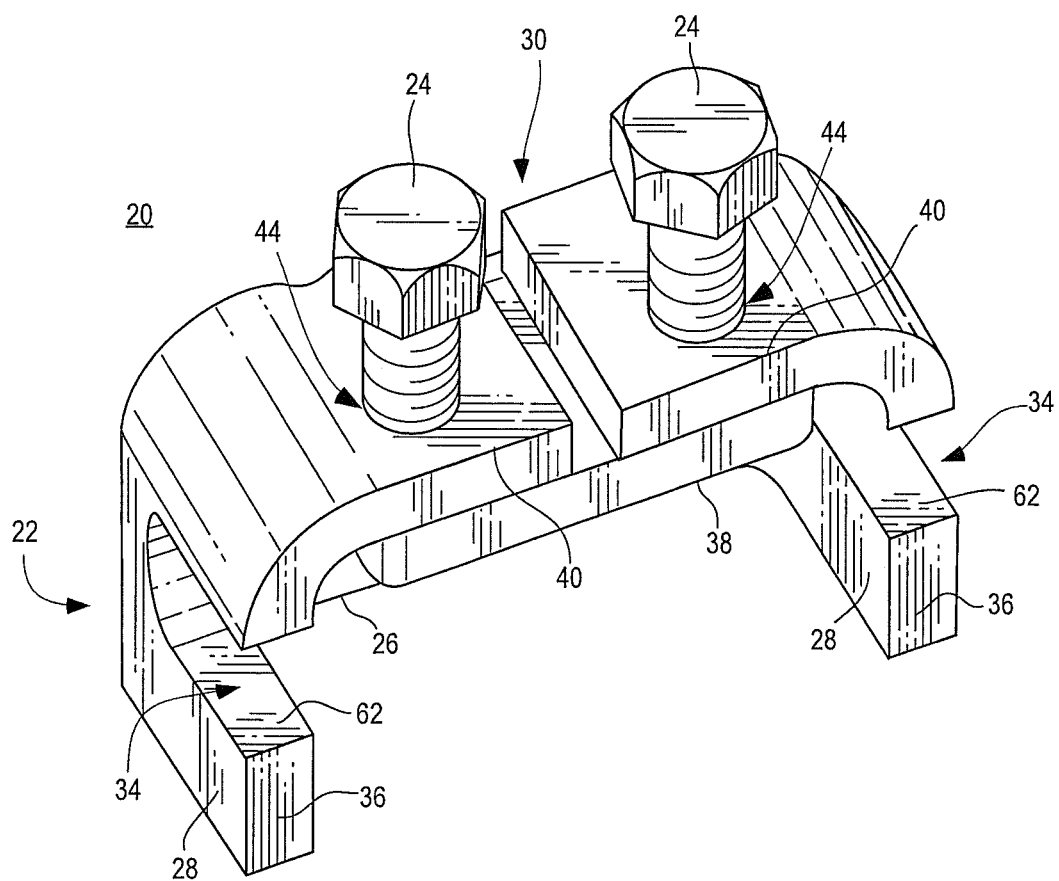
FIG. 3 is a front, left, top perspective view of the flange adapter of FIG. 1.

FIGS. 1-3 illustrate a flange adapter 20, according to one embodiment of the invention. In some embodiments, the flange adapter 20 can be used to couple an object, such as a brace or a hanging member (e.g., a threaded rod), to a flange of a building support, such as a W beam, S beam or web joist. For example, the flange adapter 20 can be used to couple a seismic brace to a W beam, an S beam, an angle iron, or another structure of a building ceiling. This can be useful, for example to appropriately secure the seismic brace to the building structure and thereby help to prevent swaying of a sprinkler or other piping system during seismic activity. In some embodiments, the flange adapter 20 can be used in other settings, including to secure objects to other types of building structures.

Generally, embodiments of the invention include a unitary main body and one or more fasteners that can be used to secure the main body to relevant building structure. In the embodiment illustrated in FIGS. 1-3, the flange adapter 20 includes a main body 22 and a set of two threaded fasteners 24. The main body 22 includes a back wall 26 and a pair of opposing side walls 28 that extend generally perpendicularly from opposite ends of the back wall 26. The main body 22 also generally includes a top wall 30 that is generally perpendicular to the back wall 26 and to the side walls 28. In the embodiment illustrated, the top wall 30 includes at least two distinct layers of material (i.e., is a "double layered" or "overlapping" top wall), as also discussed below.

In some embodiments, attachment structures can be provided, as may be useful for securing brackets or other components to the relevant flange adapter. In the embodiment illustrated in FIGS. 1-3, for example, a central area of the back wall 26 includes at least one attachment structure configured as an attachment aperture 32 (not shown in FIG. 3). The attachment aperture 32 (or other attachment structure) can be used to secure a brace, a hanging member, or another object to the back wall 26 (and to the main body 22, generally), as also described below.

Each of the opposing side walls 28, as well as the top wall 30, is integrally formed with the back wall 26 such that the side walls 28 and the top wall 30 are formed as respective extensions of the back wall 26. As also discussed below, for example, the entire body 22 (e.g., the side walls 28, the back wall 26, and the top wall 30) can be formed from a single piece of metal (e.g., a single steel plate), with each of the side walls 28 and the top wall 30 being bent (e.g., stamped) to extend from the back wall 26 at an angle of approximately ninety degrees (i.e., substantially perpendicularly to the back wall 26).

Generally, embodiments of the invention can include openings to receive building structures (e.g., structural flanges) in order to assist in attaching the relevant flange adapters to the building structures. In the embodiment illustrated in FIGS. 1-3, for example, each of the opposing side walls 28 include a slot 34. Generally, each of the slots 34 of the pair of opposing side walls 28 extends towards the back wall 26 from an open end at an edge of the respective side wall 28 that is spatially removed from the back wall 26 (e.g., in the embodiment illustrated, from an opening at a front surface 36 of each of the side walls 28 that is opposite a junction between the side walls 28 and the back wall 26). As also described below, the slots 34 are generally configured to receive a flange of a building support (e.g., as shown in FIGS. 8, 10, 12, and 14). In the flange adapter 20, the slots 34 are generally formed as elongate, rectangular slots, with rounded internal corners. In other embodiments, other configurations are possible.

Generally, as also noted above, the top wall 30 of the embodiment illustrated in FIGS. 1-3 is oriented substantially perpendicularly to the back wall 26. In the embodiment illustrated, the top wall 30 is also generally oriented substantially perpendicularly to each of the opposing side walls 28. Accordingly, the back wall 26, the side walls 28 and the top wall 30 (i.e., as form the main body 22) generally exhibit a profile similar to four adjacent sides of a rectangular box. In the illustrated embodiment of the flange adapter 20, the vertices of this "box" profile are generally rounded, as may result from a stamping operation used to form the flange adapter 20 (as also described below). In other embodiments, other configurations are possible.

As also noted above, the top wall 30 of the flange adapter 20 is configured as a double layered or overlapping wall, with at least two layers of material. Generally, this can provide significant structural strength for the flange adapter 20, while also facilitating relatively strong clamping force.

In the embodiment illustrated in FIGS. 1-3, an overlapping inner layer of the top wall 30 includes a first folded section 38 and an overlapping outer layer of the top wall 30 includes second and third folded sections 40. Generally, the first folded section 38 of the inner layer is integrally formed with and extends directly from the back wall 26, so that the inner layer of the top wall 30 is generally formed as an extension of the back wall 26. As also discussed below, for example, the back wall 26 and the first folded section 38 can be formed from a single piece of metal, with the first folded section 38 being bent to extend directly from the back wall 26 (e.g., at an angle of approximately ninety degrees) to form the inner layer of the top wall 30.

Generally, it may be useful to include one or more apertures in layers of an overlapping wall, in order to receive fasteners that can be used to secure the relevant flange adapter to a relevant structure. For example, in the embodiment illustrated in FIGS. 1-3, the first folded section 38 generally includes two apertures 42 (see FIG. 1), which can be threaded or non-threaded, as appropriate, to receive fasteners such as the threaded fasteners 24. In the embodiment illustrated, the apertures 42 are threaded. In some embodiments, including as illustrated in FIGS. 1-3, the apertures 42 can be formed with substantially identical dimensions (e.g., diameters). In other embodiments, other configurations are possible, including configurations with differently sized, shaped, or located apertures, configurations with different numbers of apertures, and so on.

As discussed above, the inner layer of the top wall 30 can generally be formed from an extension of the back wall 26 (e.g., the first folded section 38). In contrast, the outer layer of the top wall 30 can generally be formed from extensions of the side walls 28. For example, in the embodiment illustrated in FIGS. 1-3, each of the second and third folded sections 40 of the outer layer is integrally formed with and extends directly from a respective one of the opposing side walls 28, so that the outer layer of the top wall 30 is generally formed from a set of extensions of the side walls 28. As also discussed below, for example, the side walls 28 and the second and third folding sections 40 can be formed from a single piece of metal (along with the back wall 26 and the first folded section 38, as noted above), with each of the second and third folding sections 40 being bent to extend directly from the respective side wall 28 (e.g., at an angle of approximately ninety degrees) to form the outer layer of the top wall 30.

Similarly to the first folded section 38, the second and third folded sections 40 of the outer layer each include a respective aperture 44, which can be threaded or non-threaded, as appropriate, to receive fasteners such as the threaded fasteners 24. In the embodiment illustrated, the apertures 44 are not threaded. Generally, each of the apertures 44 is configured to align with a respective one of the apertures 42 of the first folded section 38 when the flange adapter 20 is in its completed form (e.g., as illustrated in FIGS. 1-3). In some embodiments, the apertures 44 can be generally the same size as the apertures 42. In some embodiments, the apertures 44 can be of a generally different size than the apertures 42. Further, as similarly discussed above with regard to the apertures 42, other configurations are possible.

As noted above, the apertures 42, extending through the first folded section 38, and the apertures 44, extending through the second and third folded sections 40, are generally configured to receive the threaded fasteners 24. This can be useful, for example, not only to attach the flange adapter 20 to building structure (as also discussed below), but also to help hold the flange adapter 20 in the desired form (e.g., as illustrated in FIGS. 1-3). In some embodiments, in order to allow for appropriate clearances during assembly and installation, only one of the sets of the apertures 42 and 44 are threaded. In some embodiments, for example, the apertures 42 can be threaded while the apertures 44 can be non-threaded. In some embodiments, the apertures 42 can be non-threaded while the apertures 44 can be threaded. As noted above, in the embodiment illustrated in FIGS. 1-3, the apertures 42 are threaded, and the apertures 44 are not threaded.

Both of the threaded fasteners 24 in the illustrated embodiment are configured as hex head screws, each with a respective bottom end that tapers to a respective bottom point 48. In other embodiments, the threaded fasteners 24 (or other fasteners) can be differently configured (e.g., as other types of fasteners, as threaded fasteners with flat bottoms, and so on).

Figure 4:
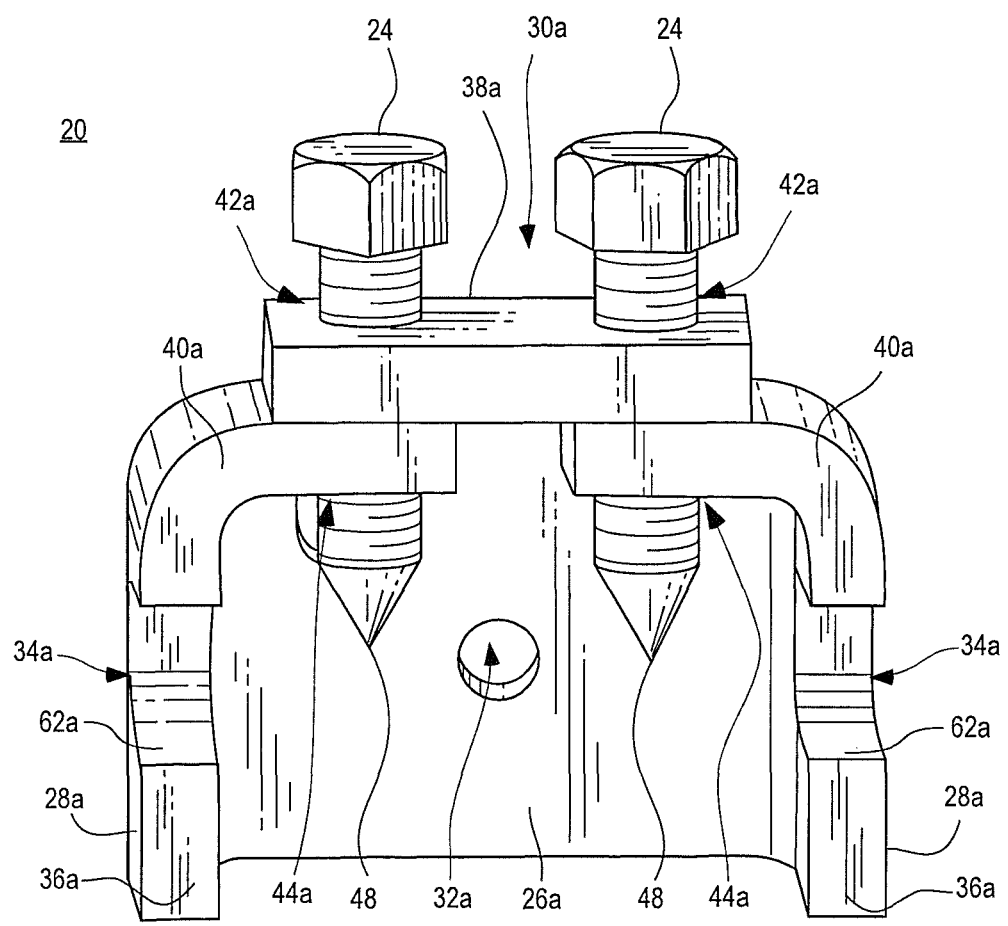
FIG. 4 is a front, top perspective view of another flange adapter, according to an embodiment of the invention.

FIG. 4 illustrates a flange adapter 20a, according to another embodiment of the invention. Generally, the flange adapter 20a is similar to the flange adapter 20 (see, e.g., FIGS. 1-3), with similar parts similarly numbered but with an appended "a." However, in the embodiment illustrated, inner and outer layers of a double layered top wall 30a of the flange adapter 20a exhibit a generally opposite configuration as the top wall 30. For example, in the flange adapter 20a, a first folded section 38a extending directly from a back wall 26a is included in the outer layer of the top wall 30a, while second and third folded sections 40a extending directly from side walls 28a are included in the inner layer of the top wall 30a.

In some embodiments, the flange adapter 20a can be formed from the same (or similar) stamped stock as can be used to form the flange adapter 20, depending on the needs of a particular installation. In different embodiments, aspects of the flange adapter 20a can be varied in ways similar to those discussed above with regard to the flange adapter 20.

FIG. 5 illustrates another flange adapter 20b, according to another embodiment of the invention. Generally, the flange adapter 20b is similar to the flange adapter 20 (see, e.g., FIGS. 1-3), with similar parts similarly numbered but with an appended "b." However, in the embodiment illustrated, each slot 34b for attaching the flange adapter 20b to a building structure includes a set of teeth 46b, which can help to securely engage the flange adapter 20b with the building structure. In other embodiments, other engagement structures can provide similar functionality. For example, other non-flat contours can be provided in place of (or in addition to) the teeth 46b, the teeth 46b can be configured with different geometry (e.g., shape, number, spacing, and so on), engagement structures can be provided elsewhere on the flange adapter 20b (e.g., on other parts of the slots 34b), and so on.

As noted above, in some embodiments, flange adapters according to this disclosure can be manufactured from a single piece of continuous material. In some embodiments, the disclosed flange adapters can be formed in a stamping operation. An example stamping operation is discussed below with regard to the flange adapter 20b. It will be understood that a similar stamping operation can be used to form other flange adapters according to this disclosure, including the flange adapters 20 and 20a, and other flange adapters not expressly illustrated. Further, it will be understood that other operations to form the flange adapters 20, 20a, and 20b (or other flange adapters according to the invention) are also possible.

In one example method of manufacture, a main body 22b of the flange adapter 20b can be formed (e.g., punched) from a steel plate (or sheet) into a blank with the generally symmetric flattened shape illustrated in FIG. 6, including apertures 32b, 42b, and 44b, and the slots 34b. At this stage (or at another time in the process), one or more of the apertures 42b and 44b can be threaded. In the embodiment illustrated, the apertures 42b are threaded, so that threaded apertures are included on an inner layer of a top wall of the finished adapter 20b. In other embodiments, other configurations are possible, as also discussed above with regard to adapter 20.

Once the blank has been formed into the flattened shape of FIG. 6, the blank can be bent (e.g., via a stamping operation, along approximate bend lines 50b or others) to be shaped into the final form of the main body 22b (e.g., as illustrated in FIG. 5). For example, the blank can be stamped in order to form a back wall 26b into a first folded section 38b, to form side walls 28b into second and third folded sections 40b, and to cause the folded sections 38b and 40b to form a double layered top wall 30b (see FIG. 5) with the folded sections 40b generally to the outside of the folded section 38b. With the main body 22b thus formed, threaded fasteners (e.g., similar to the fasteners 24 of FIGS. 1-3) can be inserted into the apertures 42b and 44b to couple the first folded section 38b and the second and third folded sections 40b together, and to equip the main body 22b to be secured to relevant structures.

Once the first folded section 38b and the second and third folded sections 40b are coupled together (e.g., with fasteners similar to the fasteners 24 of FIGS. 1-3), the flange adapter 20b can generally be viewed as fully formed and assembled, and is generally ready for use. In this regard, it should be appreciated that the main body 22b can be formed completely from a single piece of material, without casting or assembly (e.g., other than the insertion of the fasteners 24). Accordingly, the method of manufacture discussed above can allow the flange adapter 20b (or other flange adapters) to be formed without the need for secondary machining and assembly operations.

FIG. 7 illustrates another example blank, which can be formed into a flange adapter similar to the flange adapter 20a (see, e.g., FIG. 4). Generally, a flange adapter formed from the blank illustrated in FIG. 7 is similar to the flange adapter 20 (see, e.g., FIGS. 1-3), with similar parts similarly numbered but with an appended "c."

In particular, FIG. 7 illustrates a blank for a main body of the flange adapter that can be formed (e.g., punched) from a steel plate (or sheet) into the illustrated generally symmetric flattened shape, including apertures 32c, 42c, and 44c, and slots 34b with teeth 46c. At this stage (or at another time in the process), one or more of the apertures 42c and 44c can be threaded. In the embodiment illustrated, the apertures 44c are threaded, so that threaded apertures are included on an inner layer of a top wall of the finished adapter. In other embodiments, other configurations are possible, as also discussed above with regard to adapter 20.

Once the blank has been formed into the flattened shape of FIG. 7, it can be bent (e.g., via a stamping operation, along bend lines 50c or others) to be shaped into a final form (not shown) similar to that of the flange adapter 20a (see FIG. 4). For example, the blank can be stamped in order to form a back wall 26c into a first folded section 38c, to form side walls 28c into second and third folded sections 40c, and to cause the folded sections 38c and 40c to form a double layered top wall (not shown) with the folded sections 40c generally to the inside of the folded section 38c (e.g., similar to the folded sections 40a relative to the folded section 38a). With a main body thus formed, threaded fasteners (not shown) can be inserted into the apertures 42c and 44c to couple a first folded section 38c and second and third folded sections 40c together, and to equip the main body to be secured to relevant structures.

In some embodiments, multiple flange adapters can be formed from a single starting piece. For example, in some embodiments, generally symmetrical or other blanks (not shown) can be formed to exhibit two or more of the shapes illustrated in FIGS. 6 and 7, joined by intervening material. As appropriate, flange adapters can then be stamped simultaneously or separately from the blanks and then separated (e.g., after being otherwise fully formed) for use.

In the examples discussed above, the different layers of the various top walls (e.g., the top walls 30, 30a, and 30b) are coupled together using threaded fasteners (e.g., the fasteners 24 illustrated in FIGS. 1-4). In some embodiments, the layers of a double layered wall can alternatively (or additionally) be coupled together in other ways, such as with high-strength adhesive, with an external clamp, or with other suitable couplings.

Once appropriately formed (e.g., as described above), a flange adapter according to the invention can be used to secure a variety of objects to a variety of structures. In the examples below, certain flange adapters are described in relation to coupling a seismic brace or a hanging member to a structural beam. In other arrangements, other flange adapters according to the invention can be similarly employed. Likewise, flange adapters according to the invention (e.g., the flange adapters 20, 20a, and 20b) can be used in various settings other than those expressly described below, in order to secure any number of different objects to any number of different structures.

As illustrated in FIG. 8, the flange adapter 20 can be used to couple an object such as a brace member 52 to a building structure such as a W beam 54. In some embodiments, to achieve this coupling, the flange adapter 20 can first be coupled to the brace member 52 and can then be coupled to the W beam 54. In other embodiments, the flange adapter 20 can first be coupled to the W beam 54 and can then be coupled to the brace member 52. In either case, to couple the flange adapter 20 to the brace member 52, a fastener 56 (e.g., a bolt) can be inserted into the attachment aperture 32 of the back wall 26 in order to couple a brace mount (e.g., a bracket 58) for the brace member 52 to the flange adapter 20.

In some embodiments, the fastener 56 can be secured within the attachment aperture 32 by threading a nut (not shown) onto the fastener 56. In some embodiments, the fastener 56 can be secured within the attachment aperture 32 via engagement of the fastener 56 with internal threads (not shown) formed in the attachment aperture 32. In other embodiments, a fastener can be secured within the attachment aperture 32 in other ways. Similarly, in some embodiments, the bracket 58 (or another object) can be secured to the flange adapter 20 (e.g., at the back wall 26) in other ways.

To couple the flange adapter 20 to the W beam 54, a horizontal flange 60 of the W beam 54 is first received within the slots 34 on the side walls 28 of the main body 22. Once the horizontal flange 50 is received within the slots 34, the threaded fasteners 24 of the flange adapter 20 are advanced through the apertures 42 and 44, as necessary, until the bottom points 48 of the threaded fasteners 24 (see FIG. 1) contact an upper wall of the horizontal flange 60. With appropriate tightening of the threaded fasteners 24 against the horizontal flange 60, an appropriate clamping force can then be obtained to secure the horizontal flange 60 between the bottom points 48 of the threaded fasteners 24 (see FIG. 1) and an opposing surface 62 of each of the slots 34, and, generally, to secure the brace member 52 to the W beam 54.

As the flange adapter 20 is secured to the W beam 54 (or another structure), relatively strong clamping force can, be obtained, as compared to conventional designs. For example, as the fasteners 24 are advanced and engage the horizontal flange 50, and as clamping forces begin to be transferred from the fasteners 24 into the body 22, the first folded section 38 (see, e.g., FIGS. 1-3) can lock with the second and third folded sections 40 to efficiently transfer the relevant forces from the fasteners 24 through the side walls 28 and the back wall 26 of the main body 22. This can be useful, for example, in order to allow operators to secure the flange adapter 20 to the horizontal flange 50 with a relatively large compressive force.

In this regard, the threading of the apertures 42 (i.e., the inner apertures, in the embodiment illustrated) but not the apertures 44 (i.e., the outer apertures, in the embodiment illustrated) can also provide a number of structural advantages. For example, with the noted arrangement, when the flange adapter 20 is generally loaded, with the fasteners 24 loaded in tension, the folded section 38 is prevented from undue flexure as it (along with the fasteners 24) contacts the folded sections 40 (see, e.g., FIGS. 1-3).

As a further advantage in some embodiments, and as also noted above, attachment structures for flange adapters according to the invention can allow for attachment of supported components (e.g., brackets for seismic braces) along a surface or with a general orientation that is substantially perpendicular to the relevant flange. For example, as illustrated in FIG. 8, the placement of the attachment aperture 32 on the back wall 26, allows the bracket 58 to be attached to the flange adapter 20 at a surface (i.e., the back wall 26) that is generally perpendicular to the horizontal flange 60. This can be useful, for example, in order to provide appropriate clearance for the brace member 52 for a desired range of motion or a range of desired installation angles. It will be understood that similar options for the orientation of the flange adapter 20 (e.g., relative to the orientation of the top wall 30) can be selected for other types of building structures.

Figure 9:
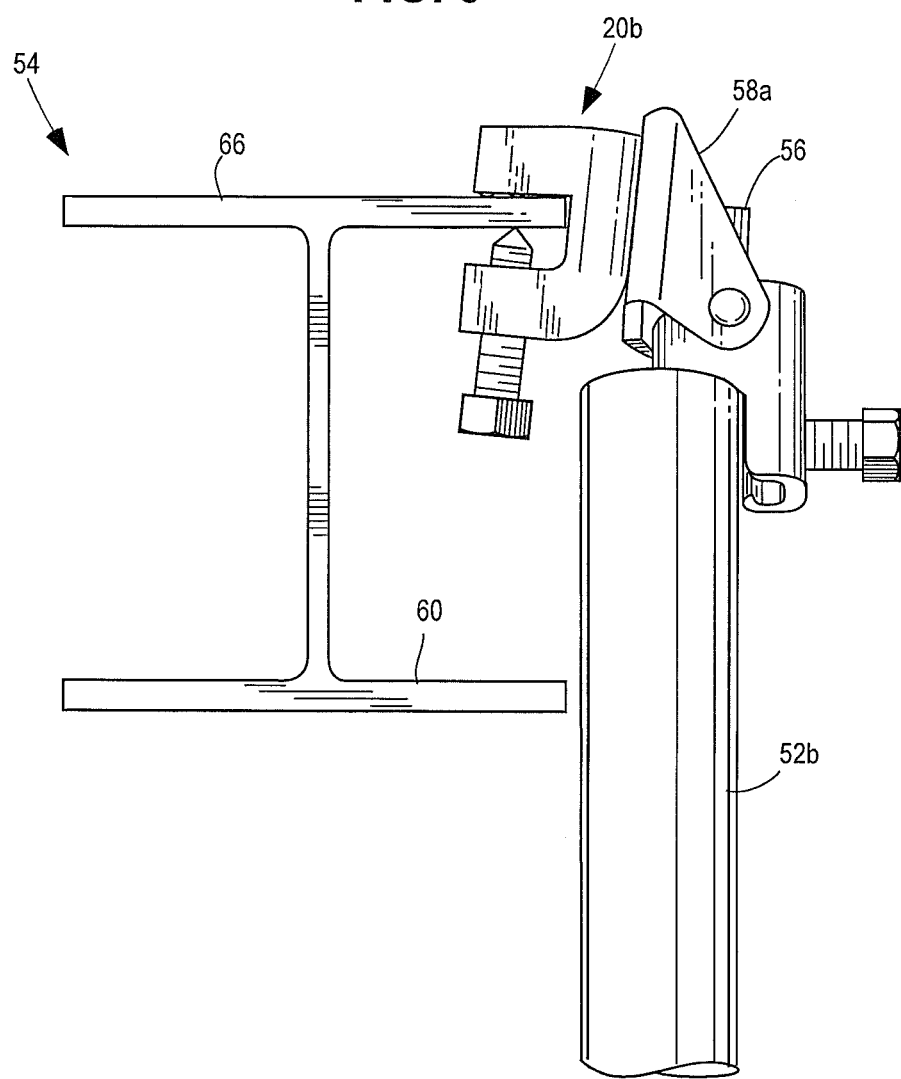
FIG. 9 is a perspective view of the flange adapter of FIG. 5 coupling a large-diameter brace to the W beam of FIG. 8.
Figure 10:
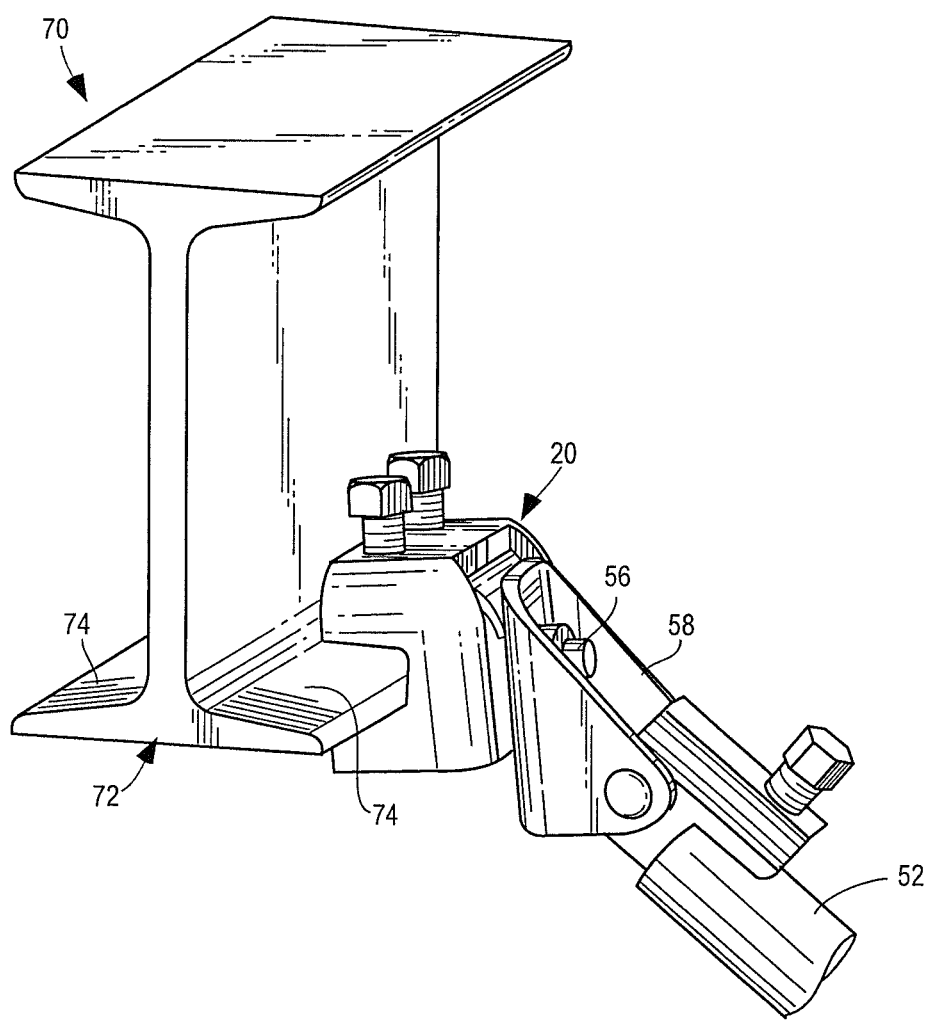
FIG. 10 is a perspective view of the flange adapter of FIG. 1 coupling the brace of FIG. 8 to an S beam.

Another example of the benefits of the noted configuration is illustrated in FIG. 9. In particular, FIG. 9 illustrates the flange adapter 20b installed to secure a large-diameter brace member 52b to an upper flange 66 of the W beam 54. Notably, because the brace member 52b is secured to the back wall 26b of the flange adapter 20b (e.g., rather than a top or bottom wall, as in conventional designs), adequate clearance with the lower flange 60 is provided. Accordingly, the brace member 52b, as supported by a bracket 58a, can be usefully disposed in a vertical orientation (or even angled somewhat towards the W beam 54) or other locations along a vertical plane in line with the position of the brace member 52b in FIG. 9.

The noted placement of the attachment structures (e.g., the aperture 32) on flange adapters according to some embodiments of the invention can also allow for additional flexibility relative to the installed orientation of the relevant flange adapter itself. For example, in some installations, the flange adapter 20 can be installed with the top wall 30 facing generally downwards, away from the W beam 54 (e.g., as illustrated in FIG. 8). Further, in some installations, the flange adapter can be installed on a W beam (or other structure) with the top wall 30 facing generally upwards (e.g., in a configuration similar to that illustrated in FIG. 10), while still allowing for orientations of a brace member similar to those illustrated in FIGS. 8 and 9 (and other orientations).

In addition to exhibiting flexibility relative to installed orientation, flange adapters according to the invention can also be used to couple objects to other types of structures. For example, in the installment illustrated in FIG. 10, the flange adapter 20 can also be used to couple an object, such as the brace member 52, to different types of building structures, such as an S beam 70. Consistent with standard configurations of S beams, a horizontal flange 72 of the S beam 70 includes an upper angled surface 74, which exhibits an outwardly directed taper, such that a thickness of the horizontal flange 72 at an outer edge of the flange 72 is smaller than a thickness of the flange 72 at a base of the flange 72. To couple the flange adapter 20 (or other flange adapter according to the invention) to the horizontal flange 72, the flange adapter 20 can be installed with the overlapping top wall 30 generally disposed above the flange 72, in alignment with the angled surface 74 of the flange 72.

Figure 11:
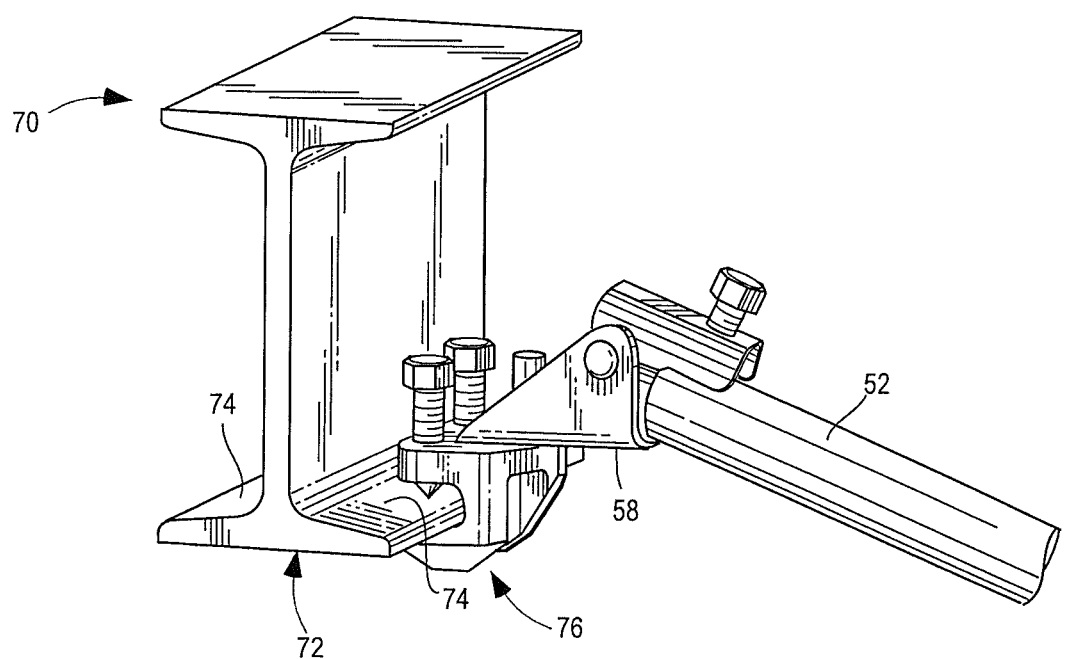
FIG. 11 is a perspective view of a conventional flange adapter coupling the brace of FIG. 8 to the S beam of FIG. 10.

In this arrangement, the bottom points 48 of the two threaded fasteners 24 (see, e.g., FIG. 1) can contact the angled surface 74 of the horizontal flange 72, while the opposing surfaces 62 of the slots 34 contact an opposing (flat) side of the horizontal flange 72. Further, the back wall 26 can be maintained substantially perpendicular to the flat portion of the horizontal flange 72 (and substantially parallel to the central structure of the S beam 70). In combination, these aspects (and/or others) can allow for significant clamping force as well as protecting the adapter 20 from being dislodged from the S beam 70, and providing for a relatively large range of orientations (or movement) of an attached object (e.g., the brace member 52). In contrast, for example, in the conventional arrangement illustrated in FIG. 11, a conventional flange adapter 76 that is similarly mounted to the S beam 70 may not exhibit as significant of clamping force. Further, particularly in view of the location of attachment of the brace assembly to the flange adapter 76, the flange adapter 76 may be subject to being dislodged due to large moments applied by the forces on the brace member 52, and, in combination with the S beam 70, may significantly restrict the range of movement or range of possible orientations for the brace member 52.

Figure 12:
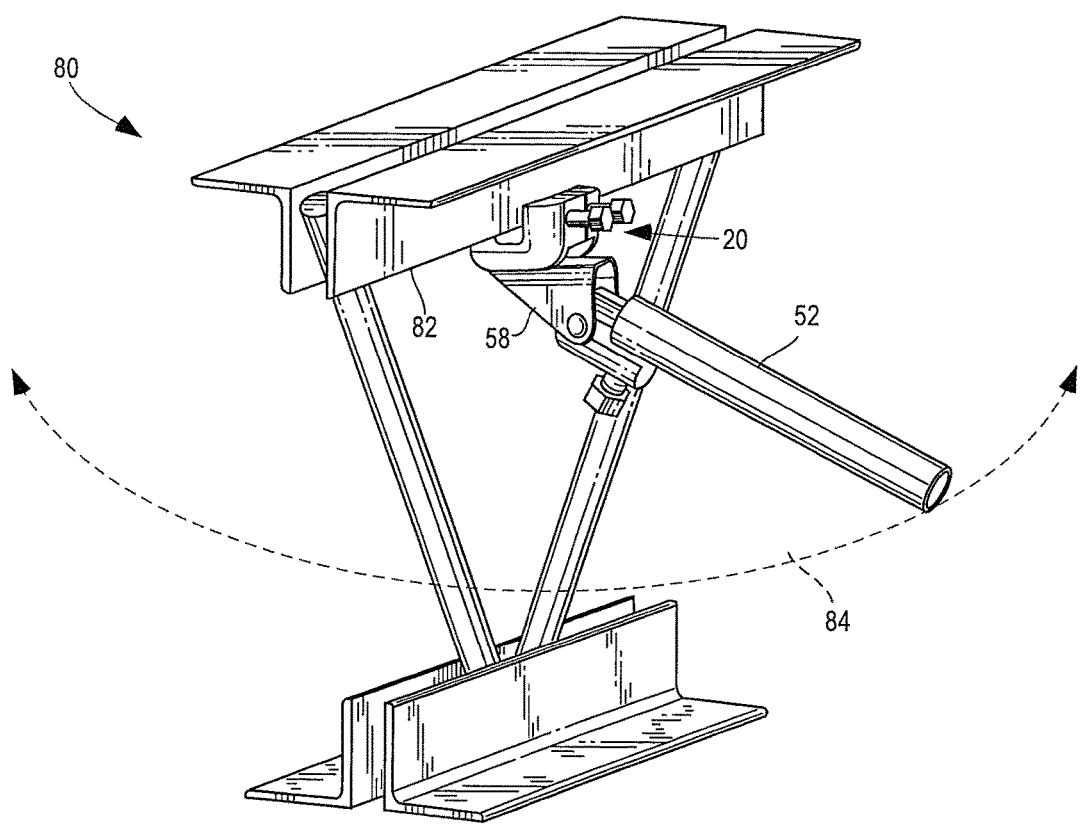
FIG. 12 is a perspective view of the flange adapter of FIG. 1 coupling the brace of FIG. 8 to an angle iron of a web joist.

In some embodiments, flange adapters according to the invention can be used to secure objects to other types of structures. For example, as illustrated in FIG. 12, the flange adapter 20 (or other flange adapters according to the invention) can be used to couple an object such as the brace member 52 to a web joist 80. In the installation illustrated, the flange adapter 20 can be coupled to the brace member 52 (e.g., as described above), and also coupled to a vertical flange 82 of an angle iron of the web joist 80. The flange adapter 20 can be coupled to the vertical flange 82 by inserting the vertical flange 82 within the slots 34 of the side walls 28 (see FIGS. 1-3), and advancing the threaded fasteners 24 until the vertical flange 82 is securely clamped between the bottom points 48 of the threaded fasteners 24 and the opposing surfaces 62 of the slots 34 (see, e.g., FIG. 3).

FIG. 12 illustrates another aspect of the flexibility in installation afforded by flange adapters according to some embodiments of the invention. For example, due to the location of the attachment aperture 32 on the back wall 26 (see, e.g., FIG. 1)—i.e., on a wall that is opposite from and perpendicular to the slots 34—the brace member 52 can be pivoted to (or through) any number of angles along a range 84 that may exceed 180 degrees. Further, for similar reasons, it may be possible to pivot the bracket 58 (e.g., by 180 degrees) for or during attachment to the flange adapter 20, thereby further increasing the possible installation configurations enabled by the flange adapter 20. This configuration (and others according to the invention) can also provide a significantly improved range of access to the brace member 52, the bracket 58, and other associated structures.

Figure 13:
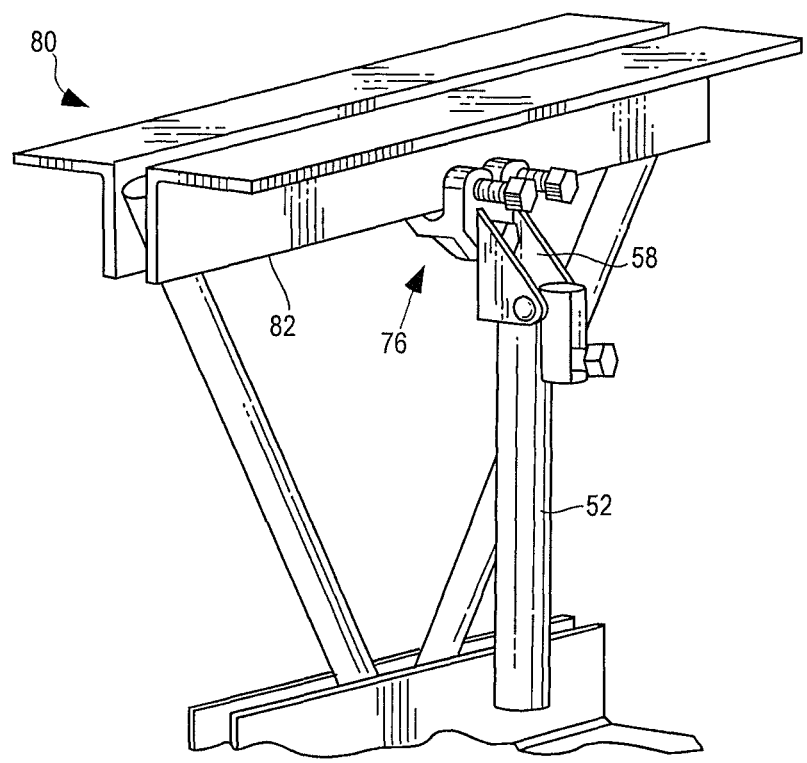
FIG. 13 is a perspective view of a conventional flange adapter coupling the brace of FIG. 8 to the angle iron of FIG. 12.

In contrast, FIG. 13 illustrates attachment of the conventional flange adapter 76 to the web joist 80. Unlike in the arrangement illustrated in FIG. 12, for example, it may not be possible to pivot the brace member 52 through the openings along the web joist 80, or to usefully access the brace member 52 (and associated structures) from a wide range of positions.

Figure 14:
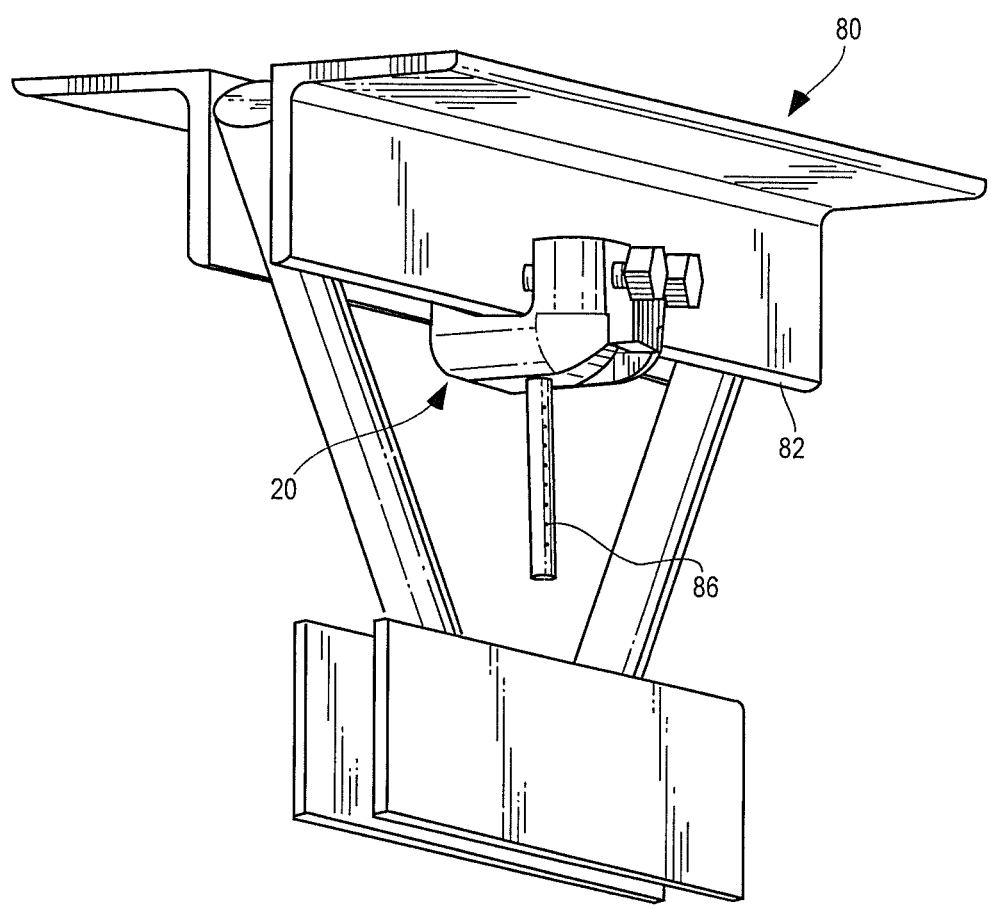
FIG. 14 is a perspective view of the flange adapter of FIG. 1 coupling a threaded rod to an angle iron of a web joist.

In some embodiments, flange adapters according to the invention can be used to secure other types of objects, such as threaded or hanging members, to a particular flange or other structure. As illustrated in FIG. 14, for example, the flange adapter 20 (or other flange adapters according to the invention) can be used to couple a threaded hanging member, such as a threaded rod 86, to the web joist 80. For example, the flange adapter 20 can be coupled to the vertical flange 82 of the web joist 80, with the threaded rod 86 secured within the attachment aperture 32 (e.g., to suspend other components below the flange adapter 20 and the web joist 80). Similar to the threaded fastener 56 described above, the threaded rod can be secured within the attachment aperture 32 (see, e.g., FIG. 1) with a nut (not shown), by threadably engaging internal threads (not shown) formed within the attachment aperture 32, or in other ways.

As also noted above, in some arrangements, the loads supported by a brace member, a threaded rod, or other object secured to a flange adapter according to the invention can be relatively large. In this regard, the double layered configurations discussed above can provide significant strength and structural stability to the flange adapter. In some embodiments, flange adapters according to the invention may exhibit particularly large strength and stability once one or more fasteners (e.g., the threaded fasteners 24) have been used to couple the layers of an overlapping wall together, thereby effectively securing the layers as single wall of double (or greater) thickness relative to the remainder of the flange adapter.

It will be understood that the embodiments discussed above are presented as examples only, and that other embodiments are possible. For example, in the flange adapters expressly illustrated in the different FIGS., no bottom wall is provided. In other embodiments, a flange adapter can include a bottom wall. In some embodiments, a flange adapter can include a double layered bottom (or other) wall that may be similar, for example, to the top wall 30 (see, e.g., FIGS. 1-3) or other overlapping wall discussed above. In some embodiments, a double layered bottom (or other) wall can include apertures similar to the apertures 42 and 44 (see, e.g., FIGS. 1-3) with threaded fasteners (or other couplings, such as adhesives, clamps, and so on) coupling the two layers of the bottom wall together to provide further structural rigidity to the flange adapter. In some embodiments, flange adapters according to the invention can use material of different (e.g., smaller or larger) thickness than the embodiments expressly illustrated in the FIGS.

Thus, embodiments of the invention provide a flange adapter for coupling a brace, a hanging member, or another object to a support structure. The improved flange adapter can provide increased ease and flexibility in installation and improved structural rigidity as compared to conventional flange adapters. Further, some embodiments of the improved flange adapter can be manufactured from a single piece of sheet metal or metal plate, thereby reducing the need for secondary machining and assembly processes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A flange adapter to attach an object to a support structure, for use with one or more fasteners, the flange adapter comprising:
    a main body that includes a back wall, a first side wall extending away from the back wall, a second side wall extending away from the back wall, and a top wall extending between the back wall, the first side wall, and the second side wall;
    the top wall including:
        a first layer that includes a first folded section extending from the back wall of the main body; and
        a second layer that includes a second folded section extending from the first side wall and a third folded section extending from the second side wall, the second layer at least partly overlapping with the first layer along the top wall; and
    a set of apertures that extend through the first and second layers of the top wall, the set of apertures being configured to receive the one or more fasteners in order for the one or more fasteners to urge the support structure into engagement with at least one of the first and second side walls.

2. The flange adapter of claim 1, wherein the main body, including the back wall, the first side wall, the second side wall, and the top wall is a single integrally formed component.

3. The flange adapter of claim 2, wherein the main body is a stamped component.

4. The flange adapter of claim 1, wherein the set of apertures includes two first-layer apertures in the first folded section, and a second-layer aperture in each of the second and third folded sections; and
    the first-layer and second-layer apertures being configured to receive a respective one of the one or more fasteners through each of the second and third folded sections, to urge the support structure into engagement with the at least one of the first and second side walls.

5. The flange adapter of claim 1, further comprising:
    a first slot extending into the first side wall; and
    a second slot extending into the second side wall;
    wherein, to secure the flange adapter to the support structure, the first slot and the second slot at least partly receive the support structure, and the one or more fasteners engages a first side of the support structure to urge a second side of the support structure into engagement with inner walls of the first and second slots.

6. The flange adapter of claim 5, wherein the first slot and the second slot extend from respective open ends to respective closed ends in a direction that is substantially perpendicular to the back tall.

7. The flange adapter of claim 6, wherein the back wall includes an attachment aperture for attaching the object to the flange adapter.

8. The flange adapter of claim 1, wherein the first layer is an inner layer of the top wall, and the second layer is an outer layer of the top wall.

9. The flange adapter of claim 8, the set of apertures includes a threaded aperture through the first layer, and a non-threaded aperture through the second layer.

10. The flange adapter of claim 1, wherein the first layer is an outer layer of the top wall, and the second layer is an inner layer of the top wall.

11. The flange adapter of claim 10, wherein the set of apertures includes a threaded aperture through the second layer, and a non-threaded aperture through the first layer.

12. A flange adapter to attach an object to a support structure, for use in combination with at least one fastener, the flange adapter comprising:
    an integrally formed, stamped main body that includes:
        a first wall configured to engage the support structure;
        a second wall with a second-wall opening to secure the object to the flange adapter; and
        a third wall formed, at least in part, from an extension of the first wall and an extension of the second wall;
        the extension of the first wall forming a first layer of the third wall;
        the extension of the second wall forming a second layer of the third wall that overlaps with the first layer of the third wall; and the first and second layers of the third wall being configured to receive the at least one fastener therethrough, to secure the support structure to the flange adapter.

13. The flange adapter of claim 12, wherein the first wall includes a slot that extends substantially in parallel with the third wall, the slot being configured to at least partly receive the support structure.

14. The flange adapter of claim 13, wherein the slot extends substantially perpendicularly to the second wall.

15. The flange adapter of claim 12, wherein the first wall, not including the extension of the first wall, is substantially perpendicular to the second wall and the third wall; and
wherein the second wall, not including the extension of the second wall, is substantially perpendicular to the first wall and the third wall.

16. The flange adapter of claim 12, wherein the extension of the first wall forms an outer layer of the third wall, and the extension of the second wall forms an inner layer of the third wall.

17. The flange adapter of claim 12, wherein the at least one fastener extends through a threaded aperture in the second layer of the third wall and a non-threaded aperture in the first layer of the third wall.

18. The flange adapter of claim 12, further comprising:
a fourth wall configured to engage the support structure;
wherein the third wall is further formed by an extension of the fourth wall that overlaps with the extension of the second wall.

19. The flange adapter of claim 18, wherein the extension of the fourth wall does not overlap with the extension of the first wall.

20. A method of forming a flange adapter to attach an object to a support structure using a fastener, the method comprising:
providing a single-piece blank;
forming a first aperture in a first portion of the single-piece blank;
forming a second aperture in a second portion of the single-piece blank;
forming a first slot and a second slot in the single-piece blank; and
bending the single-piece blank to form the flange adapter, with the bending:
aligning the first and second slots, so that the first and second slots are configured to simultaneously receive the support structure;
causing a first part of the first portion to be form a back wall of the flange adapter;
causing a first part of the second portion to form a side wall of the flange adapter that is substantially perpendicular to the back wall; and
causing a second part the first portion of the single-piece blank to overlap with a second part the second portion of the single-piece blank and thereby align the first and second apertures, so that the first and second apertures are configured to simultaneously receive the fastener to secure the support structure within the first and second slots.

* * * * *